US009638386B2

(12) United States Patent
Iwasaki

(10) Patent No.: US 9,638,386 B2
(45) Date of Patent: May 2, 2017

(54) LIGHTING FIXTURE FOR VEHICLE

(71) Applicant: ICHIKOH INDUSTRIES, LTD., Isehara-shi, Kanagawa-ken (JP)

(72) Inventor: Kazunori Iwasaki, Isehara (JP)

(73) Assignee: ICHIKOH INDUSTRIES, LTD., Isehara-Shi (JP)

(*) Notice: Subject to any disclaimer, the term of this patent is extended or adjusted under 35 U.S.C. 154(b) by 6 days.

(21) Appl. No.: 14/436,178

(22) PCT Filed: Oct. 10, 2013

(86) PCT No.: PCT/JP2013/077576
§ 371 (c)(1),
(2) Date: Apr. 16, 2015

(87) PCT Pub. No.: WO2014/061542
PCT Pub. Date: Apr. 24, 2014

(65) Prior Publication Data
US 2015/0260367 A1 Sep. 17, 2015

(30) Foreign Application Priority Data

Oct. 18, 2012 (JP) ................. 2012-230905

(51) Int. Cl.
F21V 5/04 (2006.01)
F21S 8/10 (2006.01)
(Continued)

(52) U.S. Cl.
CPC ............ *F21S 48/2212* (2013.01); *B60Q 1/24* (2013.01); *F21S 48/1154* (2013.01);
(Continued)

(58) Field of Classification Search
CPC .. F21S 48/1266; F21S 48/1275; F21S 48/215; F21S 48/2212; F21S 48/1154;
(Continued)

(56) References Cited

U.S. PATENT DOCUMENTS 4,972,307 A 11/1990 Takatsuji et al.
8,007,150 B2 * 8/2011 Yagi ..................... F21S 48/1154
362/520
(Continued)

FOREIGN PATENT DOCUMENTS

DE 34 17 034 A1 11/1985
DE 10 2005 030 932 A1 1/2007
(Continued)

Primary Examiner — Peggy Neils
(74) Attorney, Agent, or Firm — Foley & Lardner LLP

(57) ABSTRACT

It is difficult to efficiently control and design light distribution in the conventional lighting fixture for a vehicle. The present invention is provided with a semiconductor-type light source (2) and a lens (3). The lens (3) is configured from a first lens part (31), a second lens part (32), and a third lens part (33). A light-collecting pattern (SP) is formed in the first lens part (31). A first diffusing pattern (DWP) is formed in the second lens part (32). A second diffusing pattern (UWP) is formed in the third lens part (33). As a result, light distribution can be efficiently controlled and designed in the present invention.

7 Claims, 8 Drawing Sheets

(51) Int. Cl.
*B60Q 1/24* (2006.01)
*F21V 5/08* (2006.01)
*G02B 19/00* (2006.01)

(52) U.S. Cl.
CPC ....... *F21S 48/1266* (2013.01); *F21S 48/1275* (2013.01); *F21S 48/215* (2013.01); *F21V 5/045* (2013.01); *F21V 5/08* (2013.01); *G02B 19/0028* (2013.01)

(58) Field of Classification Search
CPC ............... F21S 48/1159; F21S 48/1233; F21S 48/1283; F21V 5/045; F21V 5/08; B60Q 1/24
See application file for complete search history.

(56) References Cited

U.S. PATENT DOCUMENTS 8,708,539 B2* 4/2014 Ugajin ................ F21S 48/1154
362/507

2011/0228405 A1* 9/2011 Frey ..................... B29C 45/27
359/642
2012/0075867 A1 3/2012 Chang

FOREIGN PATENT DOCUMENTS

| | | |
|---|---|---|
| EP | 2 280 214 A1 | 2/2011 |
| EP | 2 351 963 A1 | 8/2011 |
| JP | 63-012101 U | 1/1988 |
| JP | S63-012101 U | 1/1988 |
| JP | S63-40201 A | 2/1988 |
| JP | 06-054108 U | 7/1994 |
| JP | H06-054108 U | 7/1994 |
| JP | 2003-016813 A | 1/2003 |
| JP | 2003-016813 A | 1/2003 |
| JP | 2007-184239 A | 7/2007 |
| JP | 2011-228196 A | 11/2011 |
| JP | 2012-089333 A | 5/2012 |
| JP | 2012-089333 A | 5/2012 |

\* cited by examiner

LIGHTING FIXTURE FOR VEHICLE

TECHNICAL FIELD

The present invention relates to a lighting fixture for a vehicle, of a lens direct emission type, in which light from a semiconductor-type light source is made incident to a lens, and from the lens, the light incident thereto is irradiated as a predetermined light distribution pattern.

BACKGROUND ART

A lighting fixture for vehicle of this type is conventionally known (for example, Patent Literature 1). Hereinafter, a conventional lighting fixture for a vehicle will be described. The conventional lighting fixture for vehicle is provided with a light source and a lens, and a front side surface and a rear side surface of the lens are respectively composed of a first free curved surface and a second free curved surface. When the light source is lit, light from the light source is made incident from the second free curved surface to the lens as the rear side surface of the lens, and the light incident thereto is emitted (irradiated) to the outside as a predetermined light distribution pattern from the first free curved surface as the front side surface of the lens, for example, as a light distribution pattern which is made of a transversely elongated light distribution pattern and a hot zone.

CITATION LIST

Patent Literature

Patent Literature 1: Japanese Unexamined Patent Application Publication No. 2007-184239

SUMMARY OF THE INVENTION

Problems to be Solved by the Invention

However, in so far as the conventional lighting fixture for a vehicle is concerned, the transversely elongated light distribution pattern and the hot zone are respectively formed by the second free curved surface as the rear side surface and the first free curved surface as the front side surface of the lens, that is, are formed by one lens; and therefore, it is difficult to efficiently control light distribution or design light distribution.

The problem to be solved by the present invention is that, in the conventional lighting fixture for vehicle, it is difficult to efficiently control light distribution or design light distribution.

Means for Solving the Problem

A first aspect of the present invention is provided with: a semiconductor-type light source; and a lens in which light from the semiconductor-type light source is made incident from an incidence surface, and the light incident therefrom is emitted from an emission surface, and is characterized in that the lens is composed of a first lens portion to form a light focusing pattern; a second lens portion to form a first scattering pattern; and a third lens portion to form a second scattering pattern.

A second aspect of the present invention is characterized in that the first lens portion is disposed at one side of an upper part, the second lens portion is disposed at a lower part, and the third lens portion is disposed at another side of the upper part.

Effect of the Invention

In so far as the lighting fixture for a vehicle, of the present invention, is concerned, the first lens portion forms a light focusing pattern, the second lens portion forms a first scattering pattern, and the third lens portion forms a second scattering pattern. In this manner, the three light distribution patterns are respectively formed by three lens portions; and therefore, it is possible to efficiently control light distribution or design light distribution.

MODE FOR CARRYING OUT THE INVENTION

Figure 3:
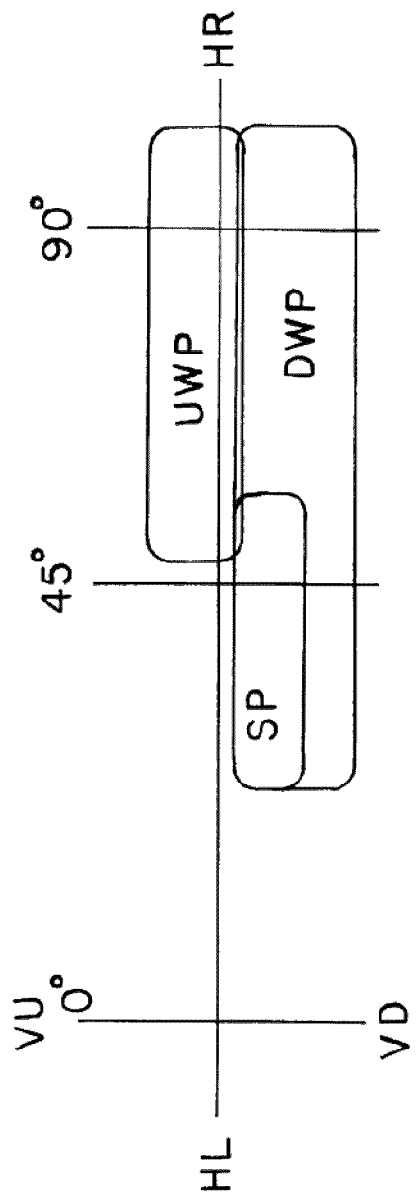
FIG. 3 is an explanatory view occupying a light focusing pattern, a first scattering pattern, and a second scattering pattern.

An embodiment (examples) of a lighting fixture for a vehicle, according to the present invention, will be described in detail with reference to the drawings. It is to be noted that the present invention is not limited by the embodiments. In FIG. 3, the vertical line "VU-VD" designates the upside to downside vertical line of a screen. The horizontal line "HL-HR" designates the left to right horizontal line. In the specification, the front, rear, top, bottom, left, and right are respectively referred to as the front, rear, top, bottom, left, and right when the lighting fixture for a vehicle, according to the present invention, is mounted on a vehicle. In the sectional views of FIG. 5 to FIG. 8, no hatching is provided in order to clarify an optical path.

Description of Configuration of the Embodiment

Figure 4:
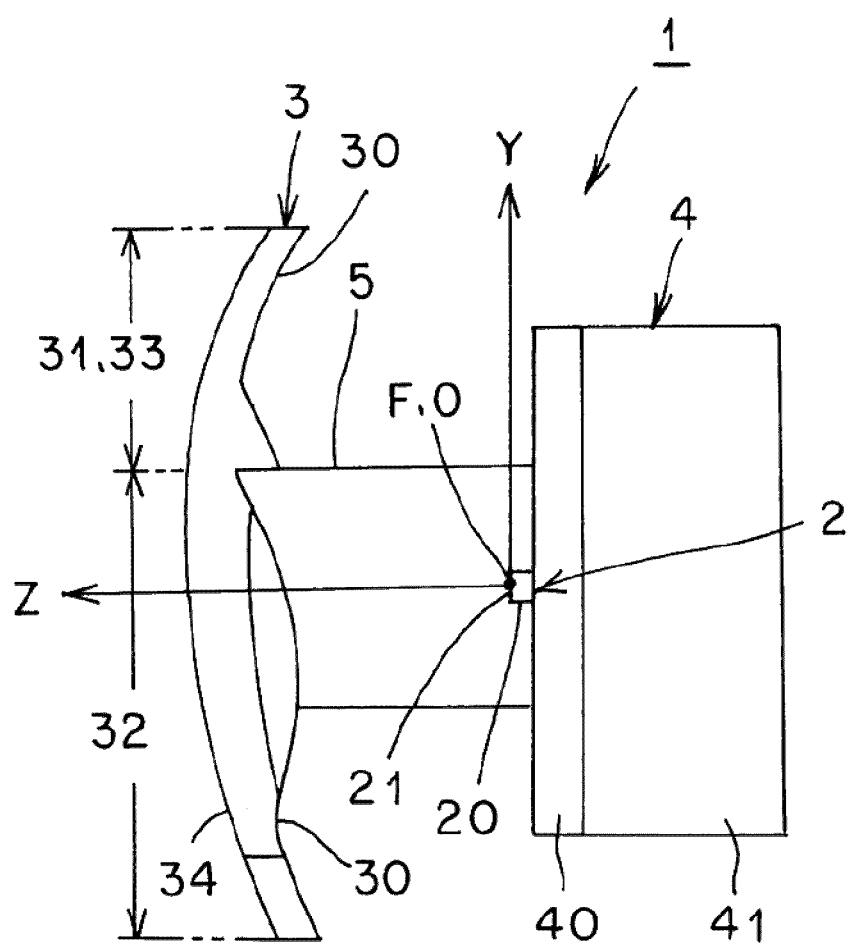
FIG. 4 is a side view showing a semiconductor-type light source, a lens, a heat sink member, and a holder (the view taken along the line IV in FIG. 2).

Hereinafter, a configuration of a lighting fixture, according to the embodiment, will be described. In FIG. 4, reference numeral 1 designates a lighting fixture for a vehicle (such as a cornering lamp, for example) according to the embodiment. The lighting fixture 1 for vehicle is mounted at each of the left and right end parts of a front part of a vehicle (not shown). Hereinafter, a right side lighting fixture 1 for vehicle, which is mounted at the right side of the vehicle, will be described. It is to be noted that a left side lighting fixture for a vehicle, which is mounted at the left side of the vehicle, forms a configuration which is substantially similar to that of the right side lighting fixture 1 for a vehicle (the configuration in which the left and right are substantially reversed from each other); and therefore, a duplicate description thereof is omitted.

Description of Lamp Unit

The lighting fixture 1 for vehicle, as shown in FIG. 1, FIG. 2, and FIG. 4 to FIG. 8, is provided with: a lamp housing (not shown); a lamp lens (not shown); three semiconductor-type light sources 2; three lenses 3; a heat sink member 4; and a holder (a mounting member) 5. One of the semiconductor-type light sources 2 and one of the lenses 3 constitute one set. In this example, three sets are used.

The three semiconductor-type light source 2 and the three lens 3 and the heat sink member 4 and the holder 5 constitute a lamp unit. The lamp housing and the lamp lens partition a lamp room (not shown). The lamp units 2, 3, 4, 5 are disposed in the lamp room, and are mounted to the lamp housing via an optical axis adjustment mechanism for vertical direction (not shown) and an optical axis adjustment mechanism for transverse direction (not shown). It is to be noted that, in the lamp room, there may be a case in which lamp units other than the lamp units 2, 3, 4, 5, for example, a headlamp for high beam, a headlamp for low and high beams, a turning signal lamp, a clearance lamp, and a daytime running lamp or the like are disposed.

Description of Semiconductor-Type Light Source 2

In this example, the semiconductor-type light source 2, as shown in FIG. 1, FIG. 2, and FIG. 4 to FIG. 8, is a self-emission, semiconductor-type light source such as an LED, an OEL, or an OLED (an organic EL), for example. The semiconductor-type light source 2 is composed of: light emitting chips (LED chips) 20; a package (an LED package) to seal the light emitting chips 20 with a sealing resin member; a board (not shown) to mount the package; a connector (not shown) which is mounted to the board and which supplies a current from a power source (a battery) to the light emitting chips 20.

The light emitting chips 20 each form a planar rectangular shape (a planar elongated shape). That is, a plurality of square chips are arranged in an X-axis direction (a horizontal direction, a transverse direction). It is to be noted that one elongated chip or one square chip may be used. A front surface of the light emitting chip 20, in this example, a front surface of the elongated shape forms a light emission surface 21. The light emission surface 21 faces a front side of a reference optical axis (a reference axis, a main optical axis) Z of the lens 3. A center O of the light emission surface 21 of the light emitting chip 20 is positioned at or near a reference focal point F of the lens 3, and is positioned on or near the reference optical axis Z of the lens 3.

In FIG. 1 and FIG. 4 to FIG. 8, axes X, Y, Z constitute a quadrature coordinate (an X-Y-Z quadrature coordinate system). The X axis is referred to as a horizontal axis in a transverse direction, passing through the center O of the light emission surface 21 of the light emitting chip 20, and in the embodiment, a left side thereof is referred to as a positive direction, and a right side thereof is referred to as a negative direction. Also, the Y axis is referred to as a vertical axis in a vertical direction, passing through the center O of the light emission surface 21 of the light emitting chip 20, and in the embodiment, an upside thereof is referred to as a positive direction, and a downside thereof is referred to as a negative direction. Further, the Z axis is referred to as a normal line (a perpendicular line), passing through the center O of the light emission surface 21 of the light emitting chip 20, that is, an axis in a forward and backward direction (a reference optical axis of the lens 3) which is orthogonal to the X axis and the Y axis, and in the embodiment, a front side thereof is referred to as a positive direction, and a rear side thereof is referred to as a negative direction. The Z axis is inclined to the fight side at about 45 degrees.

Description of Lens 3

The lens 3, as shown in FIG. 1, FIG. 2, and FIG. 4 to FIG. 8, has the reference optical axis Z and the reference focal point F. The lens 3 is fixed to the heat sink 4 via the holder 5. The lenses 3, as shown in FIG. 3, respectively irradiate beams of light from the semiconductor-type light source 2 as a light focusing pattern SP, a first scattering pattern DWP, and a second scattering pattern UWP to a front lateral side (a front right side).

The lens 3 is composed of: an incidence surface 30 to which the light from the semiconductor-type light source 2 is incident to the inside of the lens 3; and an emission surface 34 from which the incident light that has been made incident to the inside of the lens 3 is emitted as emission beams of light L1, L2, L3. The incidence surface 30 and the emission surface 34 are respectively composed of free cured surfaces.

The lens 3 is composed of: a first lens portion 31 to form the light focusing pattern SP; a second lens portion 32 to form the first scattering pattern DWP; and a third lens portion 33 to form the second scattering pattern UWP. The first lens portion 31 is disposed at one side of an upper part (the left side, inside of the vehicle). The second lens portion 32 is disposed at a lower part. The third lens portion 33 is disposed at another side of the upper part (the right side, outside of the vehicle).

Figure 5:
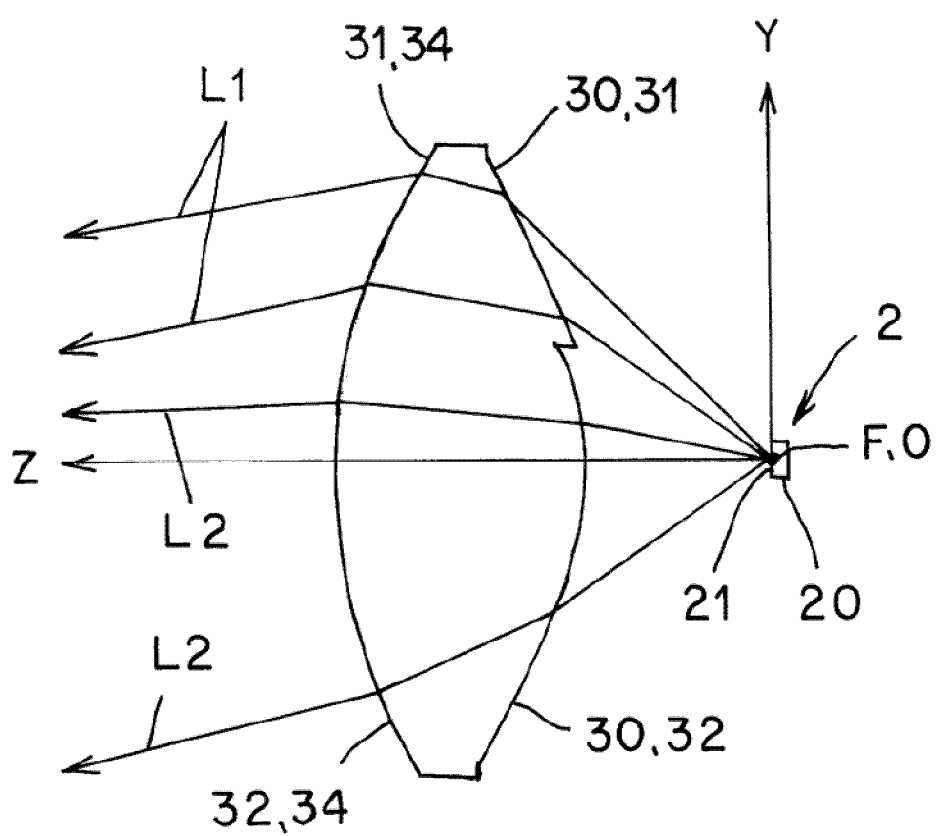
FIG. 5 is a sectional view taken along the line V-V in FIG. 1.
Figure 7:
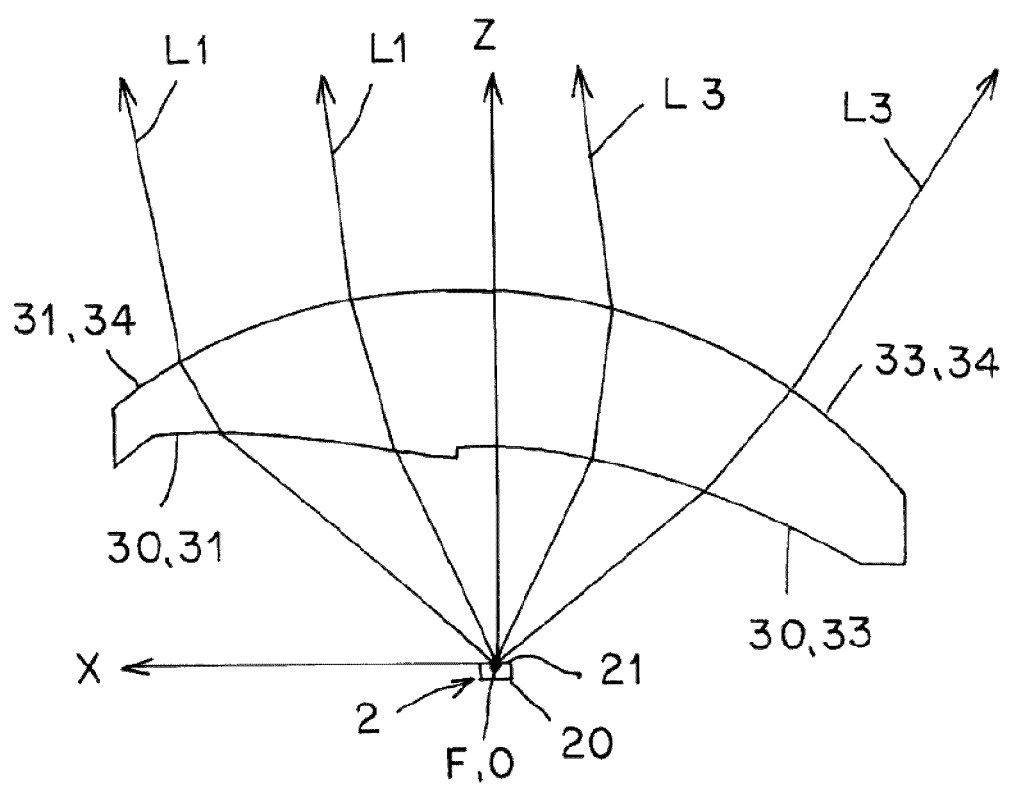
FIG. 7 is a sectional view taken along, the line VII-VII in FIG. 1.

The first lens portion 31, as shown in FIG. 5 and FIG. 7, collects and directs to the downside, the light from the semiconductor-type light source 2 as emission light L1, and irradiates the light to the outside as the light focusing pattern SR The light focusing pattern SP, as shown in FIG. 3, illuminates a range of about 2 degrees to about 10 degrees of the downside from the left side to right horizontal line HL-HR of the screen and a range of about 25 degrees to 60 degrees of the right side from the upside to downside VU-VD of the screen at a high luminous intensity. The incidence surface 30 and the emission surface 34 of the first lens portion 31 are smaller in width as these surfaces go from the Z axis to the inside (the left side) of the vehicle. As a result, the light focusing pattern SP can be easily and reliably formed inside of the first scattering pattern DWP (inside of the vehicle, the left side).

Figure 6:
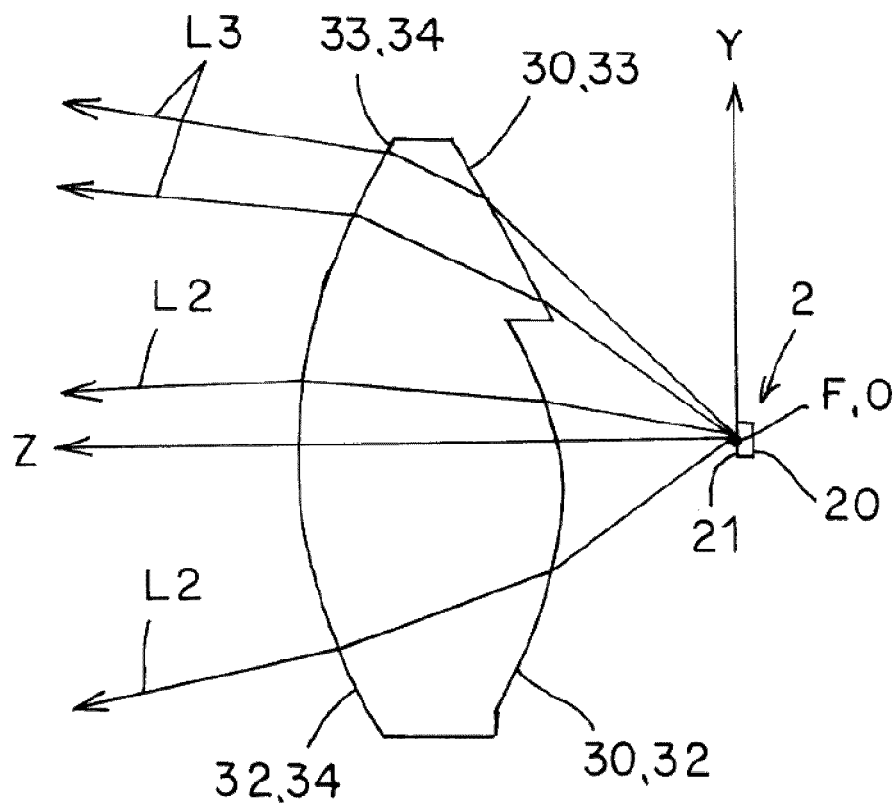
FIG. 6 is a sectional view taken along the line VI-VI in FIG. 1.
Figure 8:
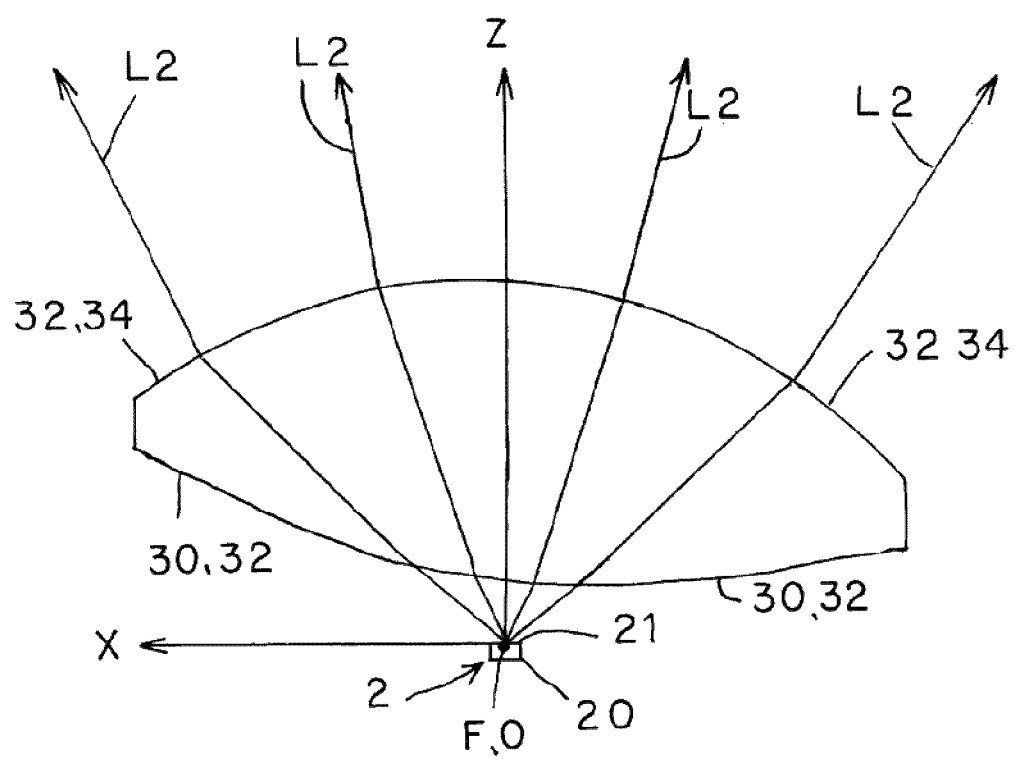
FIG. 8 is a sectional view taken along the line VIII-VIII in FIG. 1.

The second lens portion 32, as shown in FIG. 5, FIG. 6, and FIG. 8, transversely scatters the light from the semiconductor-type light source 2 to the outside as emission light L2 and then irradiates the light to the outside as the first scattering pattern DAT. The fast scattering pattern DWP, as shown in FIG. 3, illuminates a range of about 2 degrees to about 15 degrees of the downside from the left to right horizontal line HL-HR of the screen and a range of about 25 degrees to about 100 degrees of the right side from the upside to downsize vertical line VU-VD of the screen. The incidence surface 30 and the emission surface 34 of the second lens portion 32 are formed so that the beams of emission light L2 do not cross each other (so that the beams of the light are open). As a result, the scattering light distribution of the first scattering pattern DWP can he easily and reliably formed.

The third lens portion 33, as shown in FIG. 6 and FIG. 7, transversely scatters the light horn the semiconductor-type light source 2 as emission light L3 and then irradiates the light to the outside as the second scattering pattern UWP. The second scattering pattern UWP, as shown in FIG. 3, illuminates a range of about 8 degrees of the upside to about 3 degrees of the downsize from the left to right horizontal line HL-HR of the screen and a range of about 47 degrees to about 100 degrees of the right side from the upside to downside vertical line VU-VD of the screen. The incidence surface 30 and the emission surface 34 of the third lens portion 33 are constructed to be inclined toward the outside (the right side) of the vehicle. As a result, the light as the second scattering pattern UWP can be easily and reliably scattered to be more outer from the Z axis (outside of the vehicle, left and right sides). In this manner, the light as the second scattering pattern UWP is not irradiated to the upside and inside (inside of the vehicle, the left side), and stray light can be prevented. Also, when the vehicle turns at a crossing point or the like, a pedestrian can be reliably illuminated, making it possible to contribute to traffic safety.

Figure 1:
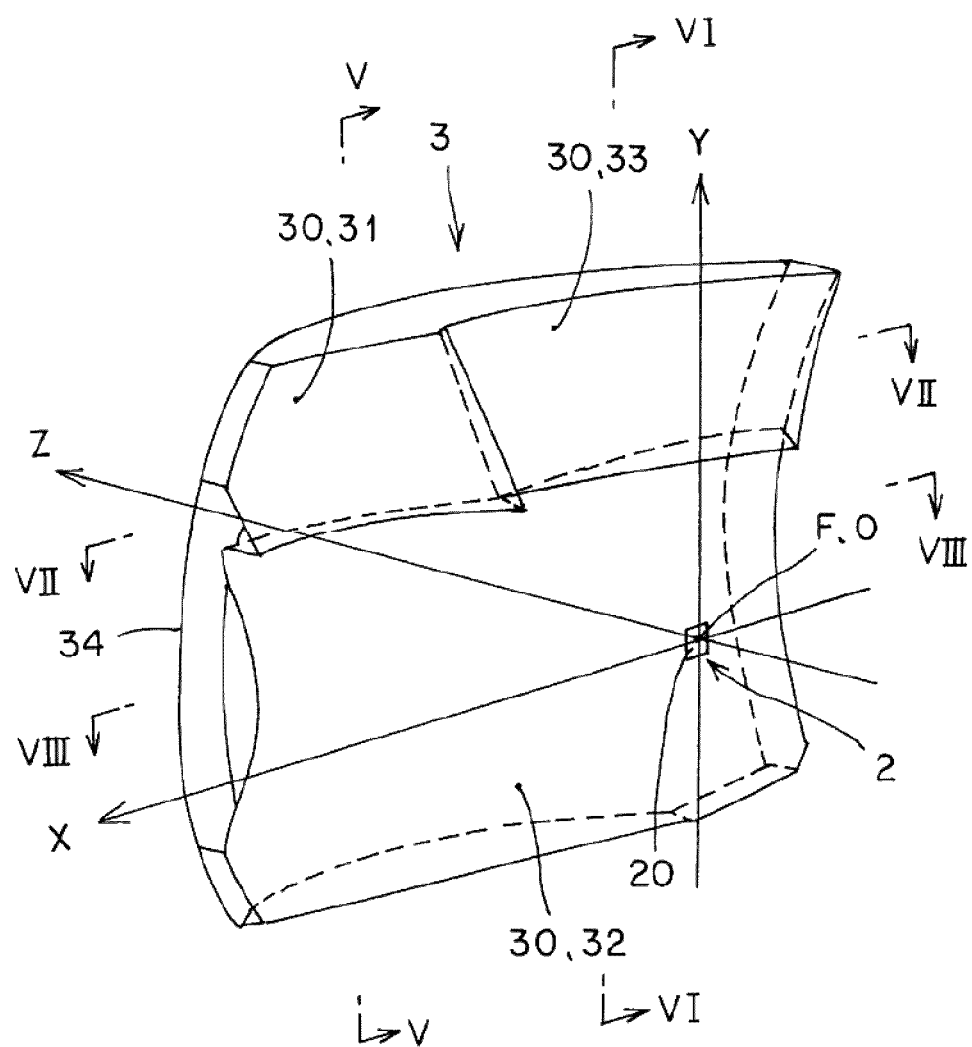
FIG. 1 shows an embodiment of a lighting fixture for vehicle, according to the present invention, and is a perspective view of a semiconductor-type light source and a lens.

The incidence surface 30 of the lens 3 is divided into three sections, the first lens portion 31, the second lens portion 32, and the third lens portion 33. As shown in FIG. 1 and FIG. 4 to FIG. 6, the height of the first lens portion 31 and the third lens portion 33 and the height of the second lens portion 32 are at a ratio of about 1:2. Also, as shown in FIG. 1 and FIG. 7, the side of the first lens portion 31 and the side of the third lens portion 33 is at a ratio of about 1:2.

Figure 2:
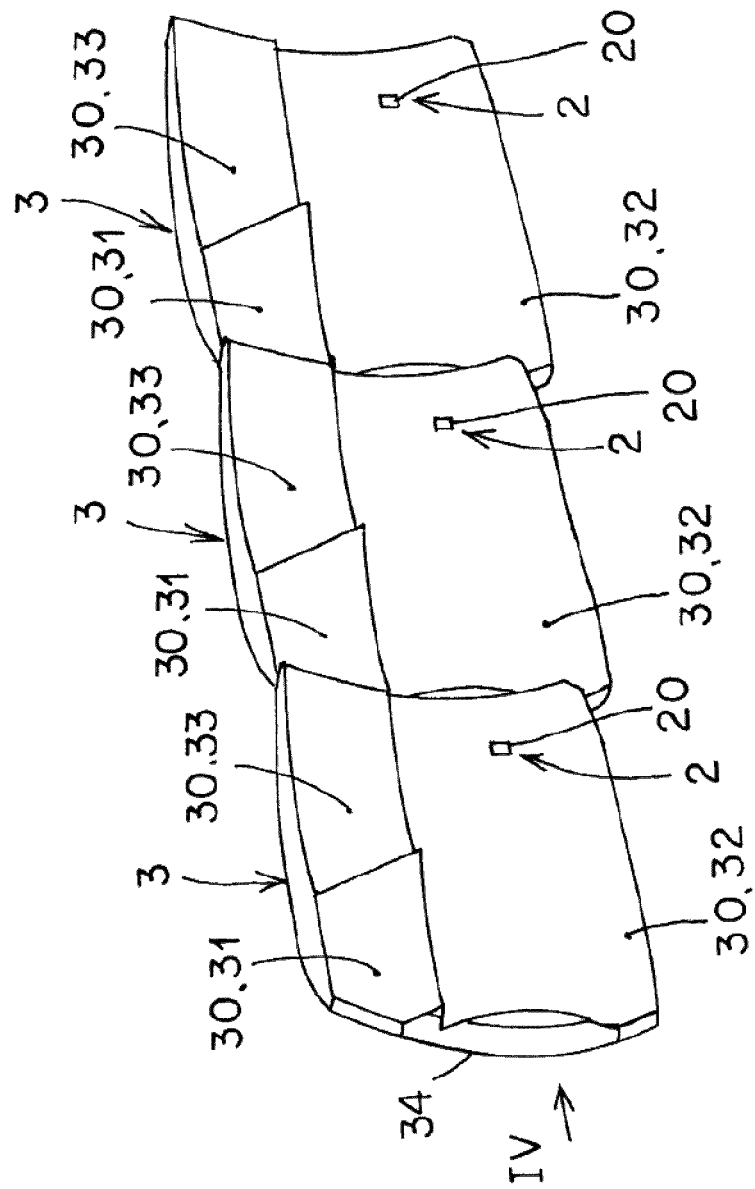
FIG. 2 is a perspective view showing three semiconductor-type light sources and three lenses.

The three lenses 3 may be integrally molded or may be respectively molded independently. In a case where these lenses are respectively molded independently, as shown in FIG. 2, the three lenses 3 are arranged in a transverse direction and then are adhesively bonded by an adhesive agent or are fixed by a fixing member or the like.

Description of Heat Sink Member 4

The heat sink member 4 radiates a heat which is generated by the semiconductor-type light source 2 to the outside. The heat sink member 4 is made of an aluminum die-cast or a resin member having a thermal conductivity and an electric conductivity, for example. The heat sink member 4, as shown in FIG. 4, is composed of: a mounting portion 40 shaped like a perpendicular plate; and a plurality of fin portions 41, each of which is shaped like a perpendicular plate and which are provided to be integrated with one surface (a rear side surface, a back surface) of the mounting portion 40. On a fixing surface of another surface (a front side surface, a front surface) of the mounting portion 40 of the heat sink member 4, the boards of the three semiconductor-type light sources 3 are respectively fixed in association with the three lenses 3 by way of screws or the like.

Description of Holder 5

The holder 5 forms a plate shape. The holder 5 is made of two holders, a right side holder and a left side holder. It is to be noted that, in FIG. 4, only the right side holder is illustrated. One end part (a front end part) of the holder 5 is fixed to the mounting portion 40 of the heat sink member 4. Another end part (a rear end part) of the holder 5 is fixed to the mounting portion 40 of the heat sink member 4. As a result, the three lenses 3 are respectively fixed in association with the three semiconductor-type light sources at the heat sink member 4 via the holder 5.

Description of Functions of Embodiment

The lighting fixture 1 for vehicle, according to the embodiment, is made of the constituent elements as mentioned above, and hereinafter, functions thereof will be described.

The three semiconductor-type light sources 2 are lit. Afterwards, the beams of light from the three semiconductor-type light sources 2 are respectively made incident to incidence surfaces 30 of the three lenses 3. The beams of light that have been made incident to the incidence surface 30 of the first lens portion 31 of the three lenses 3 are emitted from the emission surface 34, and the beams of emission light L1 each are emitted (irradiated) to the outside as the light focusing pattern SP, as shown in FIG. 5 and FIG. 7. The beams of light that have been made incident to the incidence surface 30 of the second lens portion 32 of the three lenses 3 are emitted from the emission surface 34, and the beams of emission light L2 each are emitted (irradiated) to the outside as the first scattering pattern DWP, as shown in FIG. 5, FIG. 6, and FIG. 8. The beams of light that have been made incident to the incidence surface 30 of the third lens portion 33 of the three lenses 3 are emitted from the emission surface 34, and the beams of emission light L3 each are emitted (irradiated) to the outside as the second scattering pattern UWP, as shown in FIG. 6 and FIG. 7. The light focusing pattern SP, the first scattering pattern DWP, and the second scattering pattern UWP illuminate a road surface or the like at the front lateral side (the front right side) of the vehicle.

Description of Advantageous Effects of the Embodiment

The lighting fixture 1 for a vehicle, according to the embodiment, is made of the constituent elements and functions as mentioned above, and hereinafter, advantageous effects thereof will be described.

In so far as the lighting fixture 1 according to the embodiment is concerned, the first lens portion 31 forms the light focusing pattern SP, the second lens portion 32 forms the first scattering pattern DWP, and the third lens portion 33 forms the second scattering pattern UWP. In this manner, the three light distribution patterns SP, DWP, UWP are respectively formed by the three lens portions 31, 32, 33; and therefore, it is possible to efficiently control light distribution or design light distribution.

In particular, in the lighting fixture 1 for vehicle, according to the embodiment, the first lens portion 31 is disposed at one side of an upper part (the left side, the inside of the vehicle); and therefore, as shown in FIG. 3, this lens portion is suitable to form the light focusing pattern SP which illuminates, at a high luminous intensity, a range of about 2 degrees to about 10 degrees of the downside from the left to right horizontal line HL-HR of the screen and a range of about 25 degrees to about 60 degrees of the right side from the upside to downsize vertical direction VU-VD of the screen.

In addition, the second lens portion 32 is disposed at a lower part; and therefore, as shown in FIG. 3, this lens portion is suitable to form a first scattering pattern DWP which illuminates a range of about 2 degrees to about 15 degrees of the downside from the left to right horizontal line HL-HR of the screen and a range of about 25 degrees to about 100 degrees of the right side from the upside to downside vertical line VU-VD of the screen.

Further, the third lens portion 33 is disposed at another side of the upper part (the right side, outside of the vehicle); and therefore, as shown in FIG. 3, this lens portion is suitable to form the second scattering pattern UWP which illuminates a range of about 8 degrees of the upside to about 3 degrees of the downside from the left to right horizontal line HL-HR of the screen and a range of about 47 degrees to about 100 degrees from the upside to downside vertical line VU-VD of the screen.

Description of Examples Other than the Embodiment

In the embodiment, a cornering lamp will be described. However, in the present invention, there may be employed a lamp other than the cornering lamp, for example, a fog lamp or the like.

Also, in the embodiment, the light focusing pattern SP and the first scattering pattern DWP illuminate a range of the downsize from the left to right horizontal line HL-HR of the screen, whereas the second scattering pattern UWP mainly illuminates a range of the upside from the left to right horizontal line HL-HR of the screen. However, in the present invention, the light focusing pattern SP and the first scattering pattern DWP and the second scattering pattern may illuminate a range of the downsize from the left to right horizontal line HL-HR of the screen.

Further, in the embodiment, the heat sink member 4 and the holder 5 are respectively made of independent members. However, in the present invention, the heat sink member and the holder may be composed of an integral member.

DESCRIPTION OF REFERENCE NUMERALS

1 Lighting fixture for vehicle
2 Semiconductor-type light source
20 Light emitting chip
21 Light emission surface
3 Lens
30 Incidence surface
31 First lens portion
32 Second lens portion
33 Third lens portion
34 Emission surface
4 Heat sink member
40 Mounting portion
41 Fin portion
5 Holder
F Reference focal point of lens
O Center of light emission surface of light emitting chip
HL-HR Left to right horizontal line of screen
VU-VD Upside to downside vertical line of screen
SP Light focusing pattern
DWP First scattering pattern
UWP Second scattering pattern
L1, L2, L3 Emission light
X X axis
Y Y axis
Z Reference optical axis of lens (Z axis)

The invention claimed is:
1. A lighting fixture for a vehicle, comprising:
a semiconductor-type light source; and
a lens in which light from the semiconductor-type light source is made incident from an incident surface, and the light incident therefrom is emitted from an emission surface, wherein
the lens is composed of:
a first lens portion to form a light focusing pattern, the first lens portion being disposed only at one side of an upper part of the lens;
a second lens portion to form a first scattering pattern, the second lens portion being disposed only at a lower part of the lens; and
a third lens portion to form a second scattering pattern, the third lens portion being disposed only at another side of the upper part of the lens.

2. A lighting fixture for a vehicle, comprising:
a semiconductor-type light source; and
a lens in which light from the semiconductor-type light source is made incident from an incident surface, and the light incident therefrom is emitted from an emission surface, wherein
the lens is composed of:
a first lens portion to form a light focusing pattern in which light from the semiconductor-type light source is only focused by the first lens portion;
a second lens portion to form a first scattering pattern in which light from the semiconductor-type light source is only scattered by the second lens portion; and
a third lens portion to form a second scattering pattern in which light from the semiconductor-type light source is only scattered by the third lens portion.

3. The lighting fixture for a vehicle, according to claim 2, wherein
the first lens portion is disposed at one side of an upper part of the lens,
the second lens portion is disposed at a lower part of the lens, and
the third lens portion is disposed at another side of the upper part of the lens.

4. A lighting fixture for a vehicle, comprising:
a semiconductor-type light source; and
a lens in which light from the semiconductor-type light source is made incident from an incident surface, and the light incident therefrom is emitted from an emission surface, wherein
the lens is composed of:
a first lens portion to form a light focusing pattern;
a second lens portion to form a first scattering pattern; and
a third lens portion to form a second scattering pattern, wherein the light focusing pattern is entirely within the first scattering pattern.

5. The lighting fixture for a vehicle, according to claim 4, wherein
the first lens portion is disposed at one side of an upper part of the lens,
the second lens portion is disposed at a lower part of the lens, and
the third lens portion is disposed at another side of the upper part of the lens.

6. The lighting fixture for a vehicle, according to claim 4, wherein the light focusing pattern has a higher luminous intensity than the first scattering pattern and the second scattering pattern.

7. The lighting fixture for a vehicle, according to claim 1, wherein the first lens portion, the second lens portion and the third lens portion are divided sections of the incident surface, respectively.

* * * * *